(12) United States Patent
Crowley et al.

(10) Patent No.: US 7,594,665 B2
(45) Date of Patent: Sep. 29, 2009

(54) QUICK-RELEASE JAWS WITH A SINGLE-PIECE BEARING CHUCK

(75) Inventors: Brian J Crowley, Elk Rapids, MI (US); Charlie S Carmoney, Iinterlochen, MI (US); Thomas H Dejonghe, Sterling Heights, MI (US); Thomas M Grobbel, Ortonville, MI (US); William R Stickney, Honor, MI (US)

(73) Assignee: Illinois Tool Works Inc., Glenview, IL (US)

( * ) Notice: Subject to any disclaimer, the term of this patent is extended or adjusted under 35 U.S.C. 154(b) by 284 days.

(21) Appl. No.: 11/711,910

(22) Filed: Feb. 27, 2007

(65) Prior Publication Data

US 2008/0203681 A1    Aug. 28, 2008

(51) Int. Cl.
B23B 31/18 (2006.01)
B23B 31/175 (2006.01)

(52) U.S. Cl. .................. 279/109; 279/118; 279/124; 279/132; 279/901

(58) Field of Classification Search ......... 279/106–109, 279/118–121, 124, 132, 133, 901; B23B 31/18, B23B 31/175
See application file for complete search history.

(56) References Cited

U.S. PATENT DOCUMENTS

| | | | | |
|---|---|---|---|---|
| 185,838 | A | * | 1/1877 | Saunders ............... 279/120 |
| RE08,793 | E | * | 7/1879 | Pratt ..................... 279/120 |
| 3,069,181 | A | * | 12/1962 | Hohwart et al. ......... 279/106 |
| 3,082,015 | A | * | 3/1963 | Hohwart et al. ......... 279/106 |
| 3,099,457 | A | * | 7/1963 | Hohwart et al. ......... 279/106 |
| 3,104,886 | A | * | 9/1963 | Hohwart et al. ......... 279/106 |
| 3,365,206 | A | * | 1/1968 | Hohwart et al. ......... 279/106 |
| 3,380,747 | A |   | 4/1968 | Hohwart et al. |
| 3,423,098 | A | * | 1/1969 | Toth et al. ............. 279/109 |
| 3,472,526 | A |   | 10/1969 | Hohwart |
| 4,097,053 | A | * | 6/1978 | Steinberger ............ 279/130 |
| 4,240,645 | A | * | 12/1980 | Rohm .................. 279/130 |
| 4,243,237 | A | * | 1/1981 | Rohm .................. 279/121 |
| 4,465,289 | A |   | 8/1984 | Banks |
| 5,052,700 | A | * | 10/1991 | Howard et al. .......... 279/106 |
| 5,060,957 | A | * | 10/1991 | Stolzenberg et al. ..... 279/129 |
| 5,135,242 | A | * | 8/1992 | Toth ................... 279/4.02 |
| 5,184,833 | A | * | 2/1993 | Cross et al. ............ 279/106 |
| 5,322,305 | A |   | 6/1994 | Cross et al. |
| 5,330,205 | A | * | 7/1994 | Norton ................. 279/124 |
| 5,409,242 | A | * | 4/1995 | Gonnocci .............. 279/106 |

(Continued)

FOREIGN PATENT DOCUMENTS

DE          3322201 A    *   1/1985

(Continued)

*Primary Examiner*—Eric A Gates
(74) *Attorney, Agent, or Firm*—Fletcher Yoder

(57) ABSTRACT

A workholding chuck can use actuating members that pivot within a non-split unitary front bearing. The non-split unitary front bearing can include pockets in its central bore that can allow a spherical section of an actuator arm to be inserted into the bearing. The spherical section can include radially recessed areas to facilitate the insertion into the bearing. The jaws can be retained to the actuator arms through the use of a quick-release assembly. The quick-release assembly allows the jaws to easily and quickly be changed to allow the chuck to grasp different workpieces.

14 Claims, 14 Drawing Sheets

U.S. PATENT DOCUMENTS

| | | | |
|---|---|---|---|
| 6,371,493 B1 * | 4/2002 | Barbieux | 279/106 |
| 6,375,197 B1 * | 4/2002 | Barbieux | 279/132 |
| 6,454,278 B1 * | 9/2002 | Wrobel et al. | 279/130 |
| 6,474,658 B2 * | 11/2002 | Hanai | 279/106 |
| 6,655,699 B2 * | 12/2003 | Grobbel | 279/132 |
| 6,837,499 B2 * | 1/2005 | Rohm et al. | 279/106 |
| 2001/0011800 A1 * | 8/2001 | Hanai | 279/132 |
| 2003/0160400 A1 * | 8/2003 | Rohm et al. | 279/119 |

FOREIGN PATENT DOCUMENTS

| | | | |
|---|---|---|---|
| EP | 251266 A2 | * | 1/1988 |
| EP | 1022080 A1 | * | 7/2000 |
| JP | 08229712 A | * | 9/1996 |
| JP | 11070402 A | * | 3/1999 |
| JP | 11165205 A | * | 6/1999 |
| JP | 2001219309 A | * | 8/2001 |
| JP | 2006102858 A | * | 4/2006 |

* cited by examiner

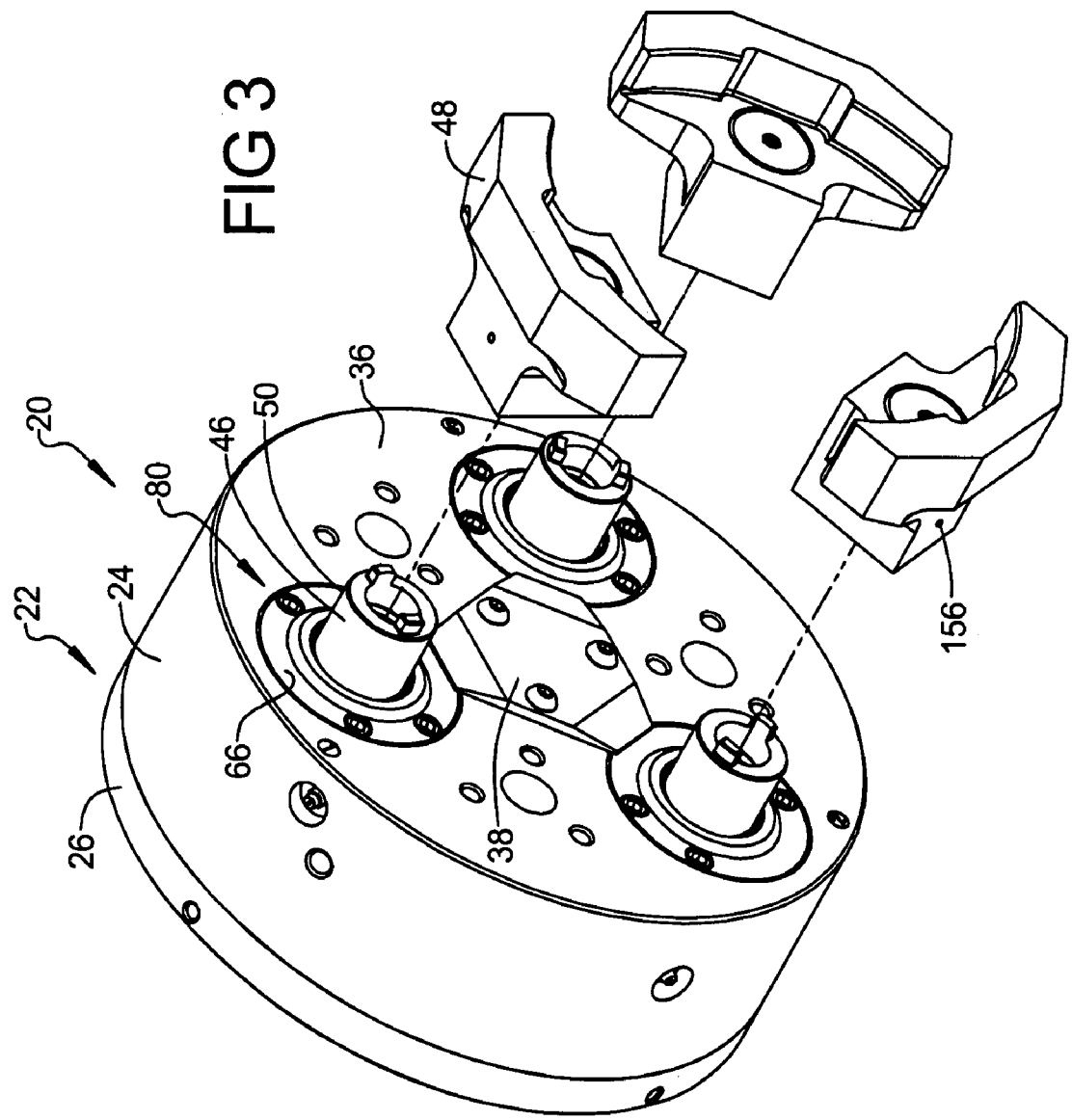

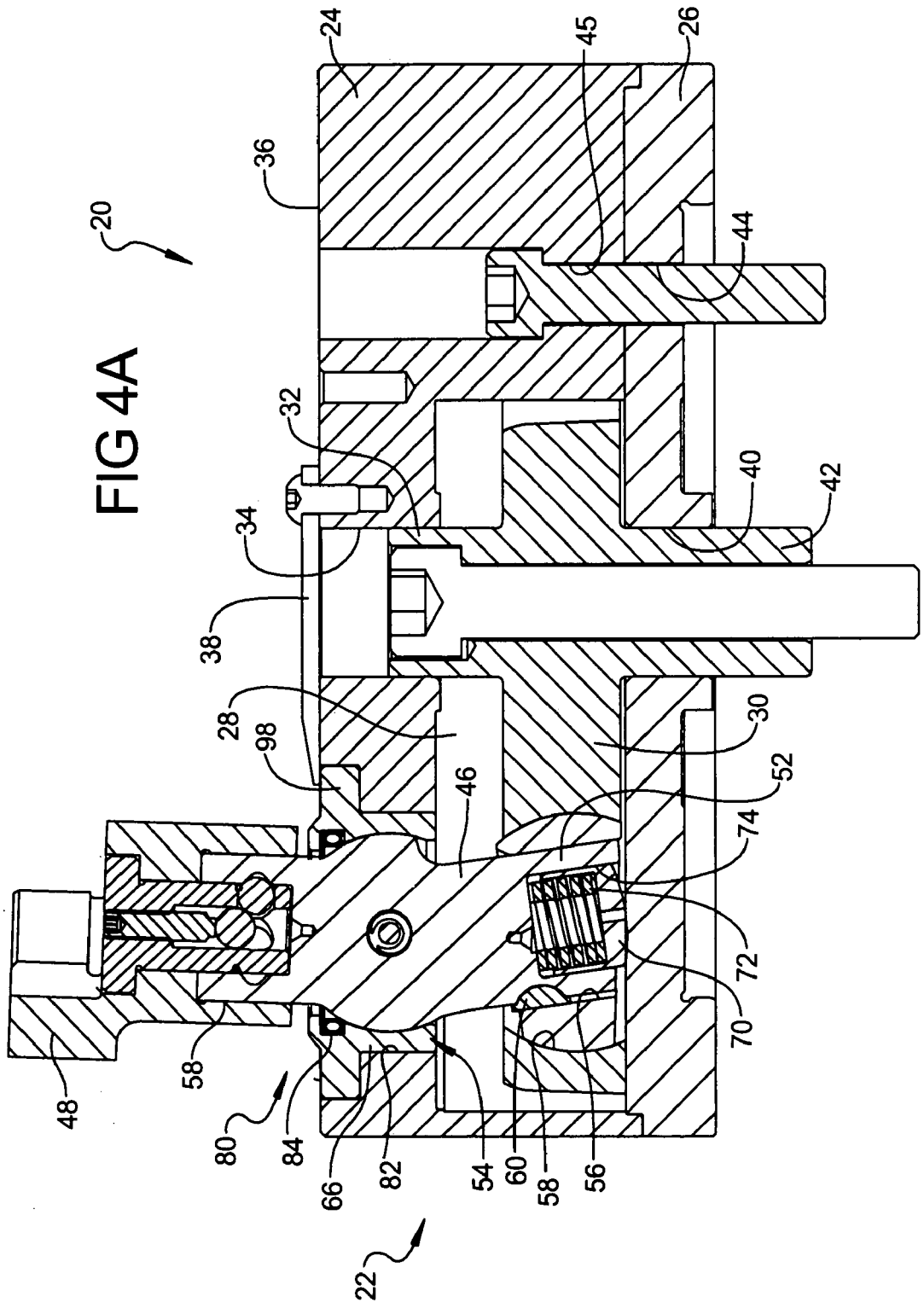

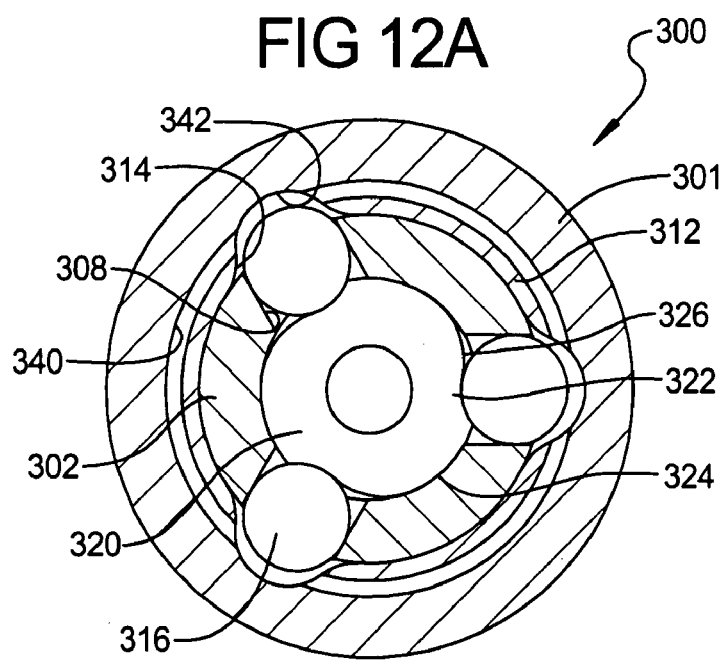
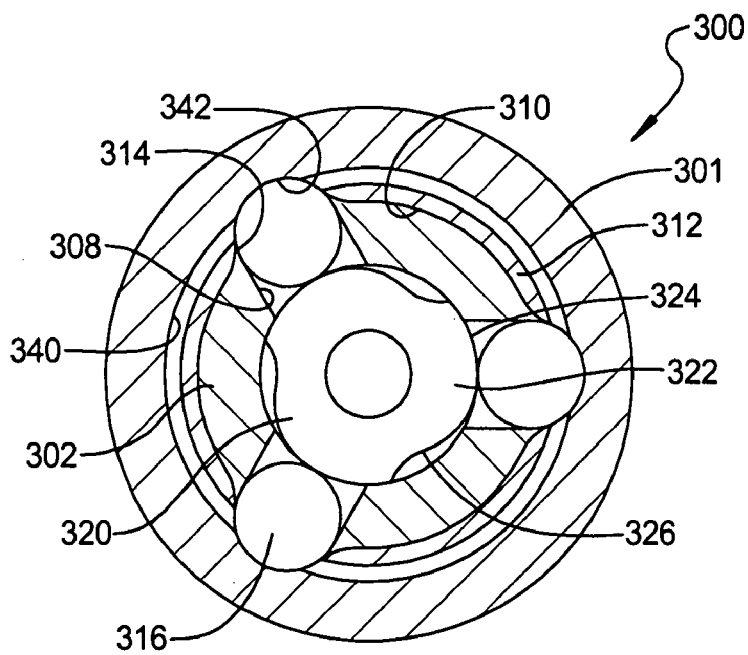

US 7,594,665 B2

QUICK-RELEASE JAWS WITH A SINGLE-PIECE BEARING CHUCK

FIELD

The present disclosure relates to a workholding chuck assembly for use in machining applications, and more specifically to a workholding chuck that can use single-piece bearings and quick-release jaws.

BACKGROUND

The statements in this section merely provide background information related to the present disclosure and may not constitute prior art.

An adjustable chuck of the type in widespread use for gripping workpieces of different sizes typically includes a plurality of jaws that is radially movable to grip and release a workpiece. The jaws are typically configured for retaining a specific workpiece; and when it is desired to use the chuck to grip different workpieces, different jaws are used. Accordingly, when it is desired to machine a different workpiece, the jaws on the chuck must be changed, which is a time consuming process.

Typically, the jaws of a chuck are attached to actuators that are located within a bearing that allows the actuators to pivot and move the jaws radially inwardly and outwardly to engage with and release the workpiece. The bearings are fractured into two pieces for assembly purposes. The use of fractured bearings, however, has drawbacks. For example, the two bearing halves must always be kept together in sets throughout the life of the bearing. Additionally, the fracture creates a gap in the bearing interface that allows grease to escape from inside the bearing during movement of the actuator. This, in turn, affects the efficiency and longevity of the bearing, actuator and, accordingly, the chuck. Moreover, the fracture can enable the bearing pieces to move slightly relative to one another as the chuck is actuated. The relative movement can affect the accuracy of the load imparted by the jaws onto the workpiece.

SUMMARY

A workholding chuck assembly according to the present disclosure uses a non-split unitary bearing having a bore therethrough to pivotally retain an actuator arm within a housing. The actuator arm can include a semi-spherical section that can fit within the bore of the non-split unitary bearing. The bearing bore can have an engaging surface that engages with the semi-spherical surfaces and can also include at least two radially recessed pockets. One end of the actuator arm can receive a workpiece retaining jaw thereon, while another end of the actuator arm can be coupled to an actuator that can drive pivotal movement of the actuator arm in the bearing to retain and release a workpiece.

In another aspect of the present disclosure, a workholding chuck assembly includes a quick-release assembly that has at least one retaining member operable to selectively secure a jaw to, and allow removal of the jaw from, an actuator arm. The quick-release assembly can allow the removal and securing of the jaw through non-removing movement of a component of the quick-release assembly that is coupled to the retaining member.

In another aspect of the present disclosure, a workholding chuck retro-fit kit includes an actuator arm and a non-split unitary bearing. The bearing has a bore therethrough with an engaging surface that can engage with a semi-spherical section of the actuator arm such that the actuator arm can pivot within the bore of the bearing.

In still another aspect of the present disclosure, a workholding chuck retro-fit kit includes a quick-release assembly operable to selectively secure a jaw to, and allow removal of a jaw from, a first end portion of an actuator arm. The quick-release assembly allows the securing and removal through non-removing movement of a component of the quick-release assembly that is coupled to the retaining member.

Thus, the present disclosure includes a non-split unitary bearing that can be used to pivotally retain an actuator arm in a workholding chuck assembly. The non-split unitary bearing can reduce the escaping of grease from the bearing. The non-split nature of the unitary bearing can improve the repeatable accuracy of the load imparted by the jaws through the actuator arm. Additionally, the quick-release assembly of the present disclosure can allow for a quick and/or easy changing of jaws on a chuck. The quick-release assembly and/or the use of a non-split unitary bearing can be provided in the form of a retro-fit kit to adapt existing chuck assemblies to achieve the benefits of the quick-release assembly and/or the use of a non-split unitary bearing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is another perspective view of the chuck of FIG. 1 showing the jaws uncoupled from the actuator arms;

Figure 1:
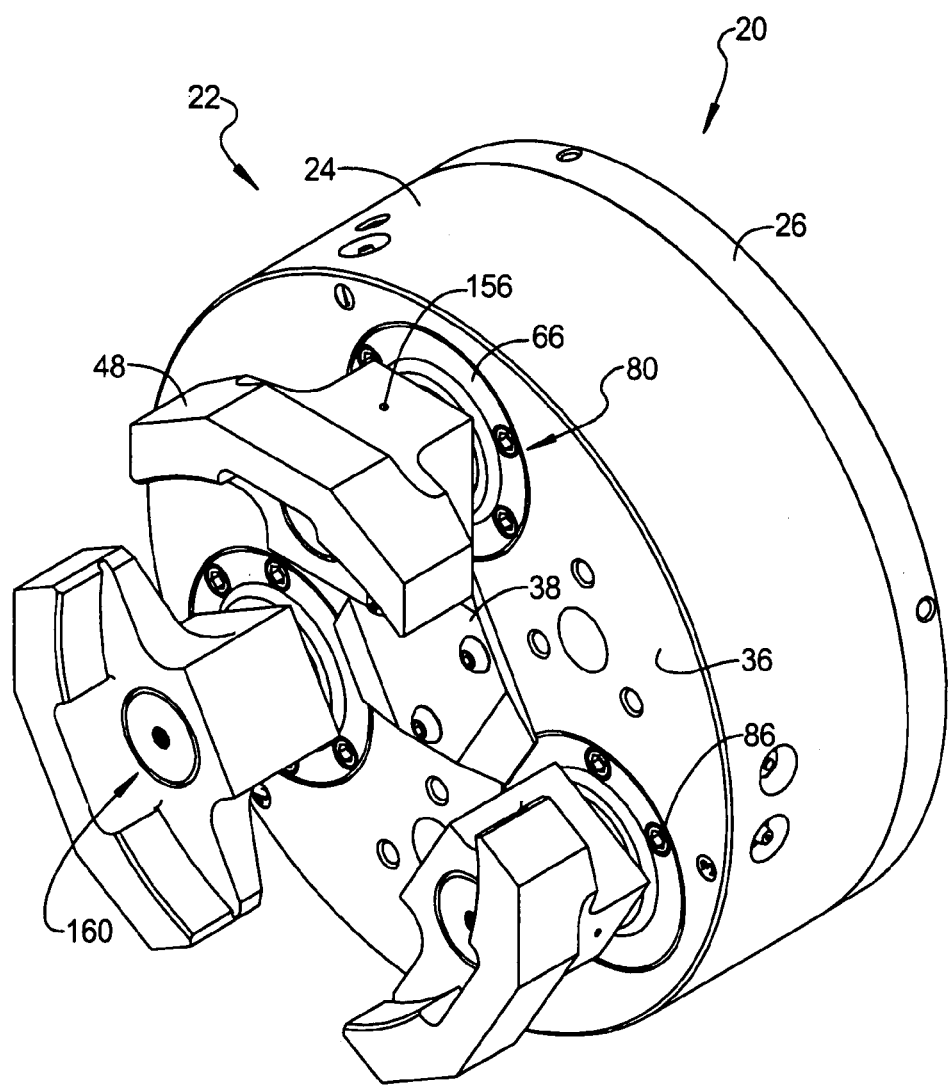
FIG. 1 is a perspective view of a chuck according to the present disclosure.
Figure 2:
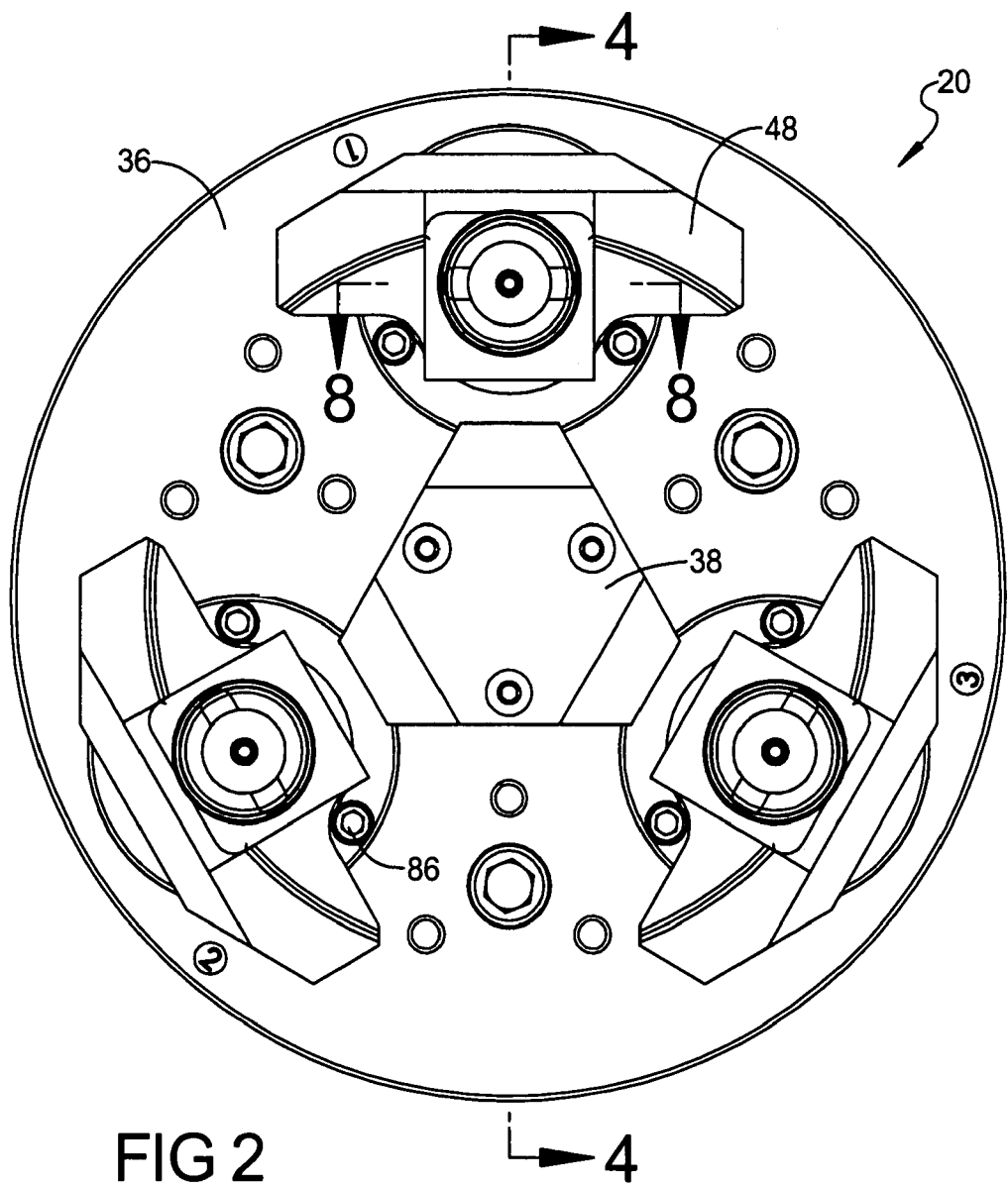
FIG. 2 is a top plan view of the chuck of FIG. 1.
Figure 5:
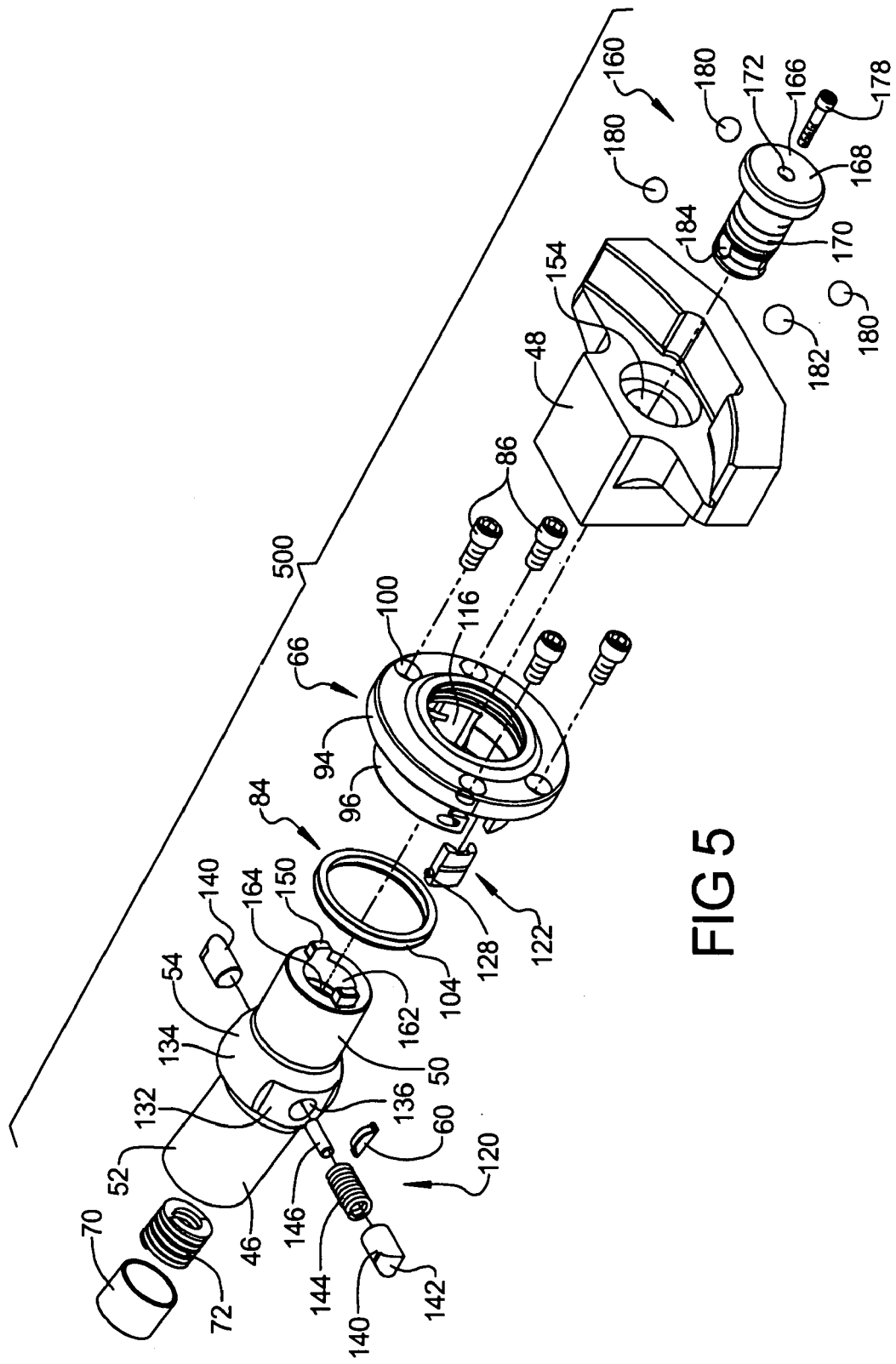
Figure 6:
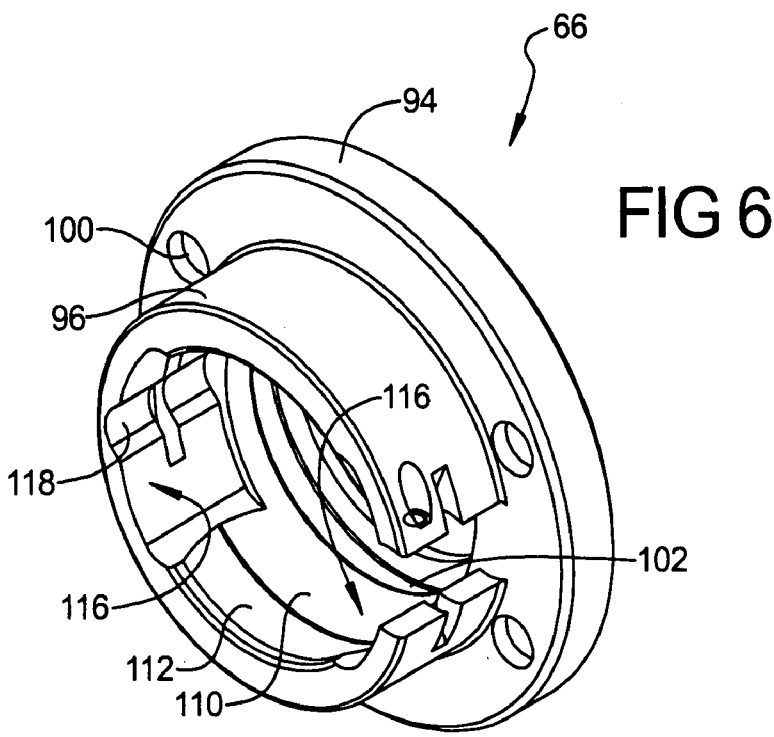
Figure 7:
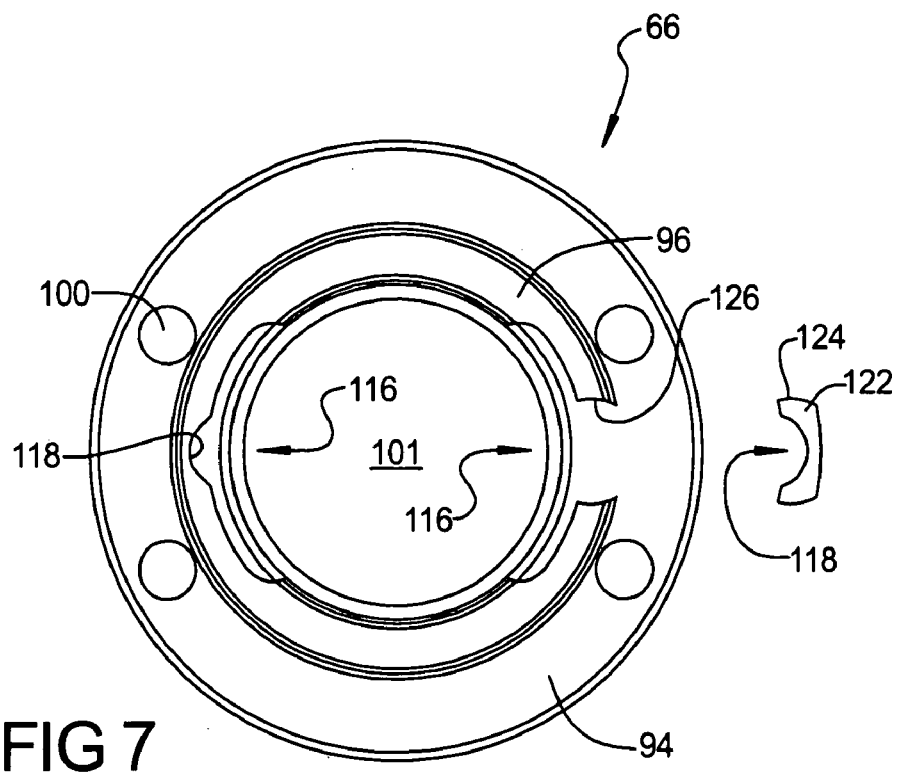
Figure 8A:
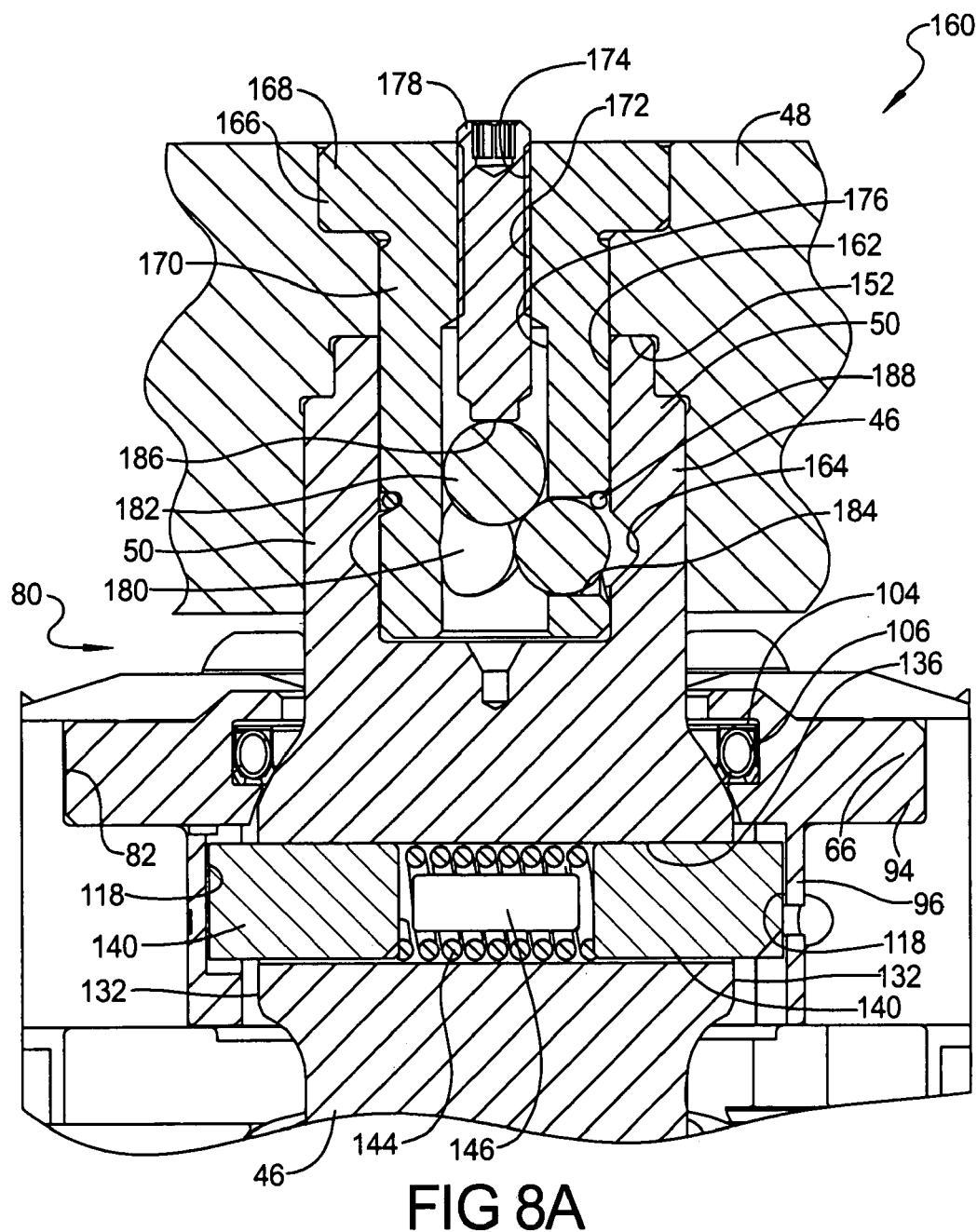
Figure 9:
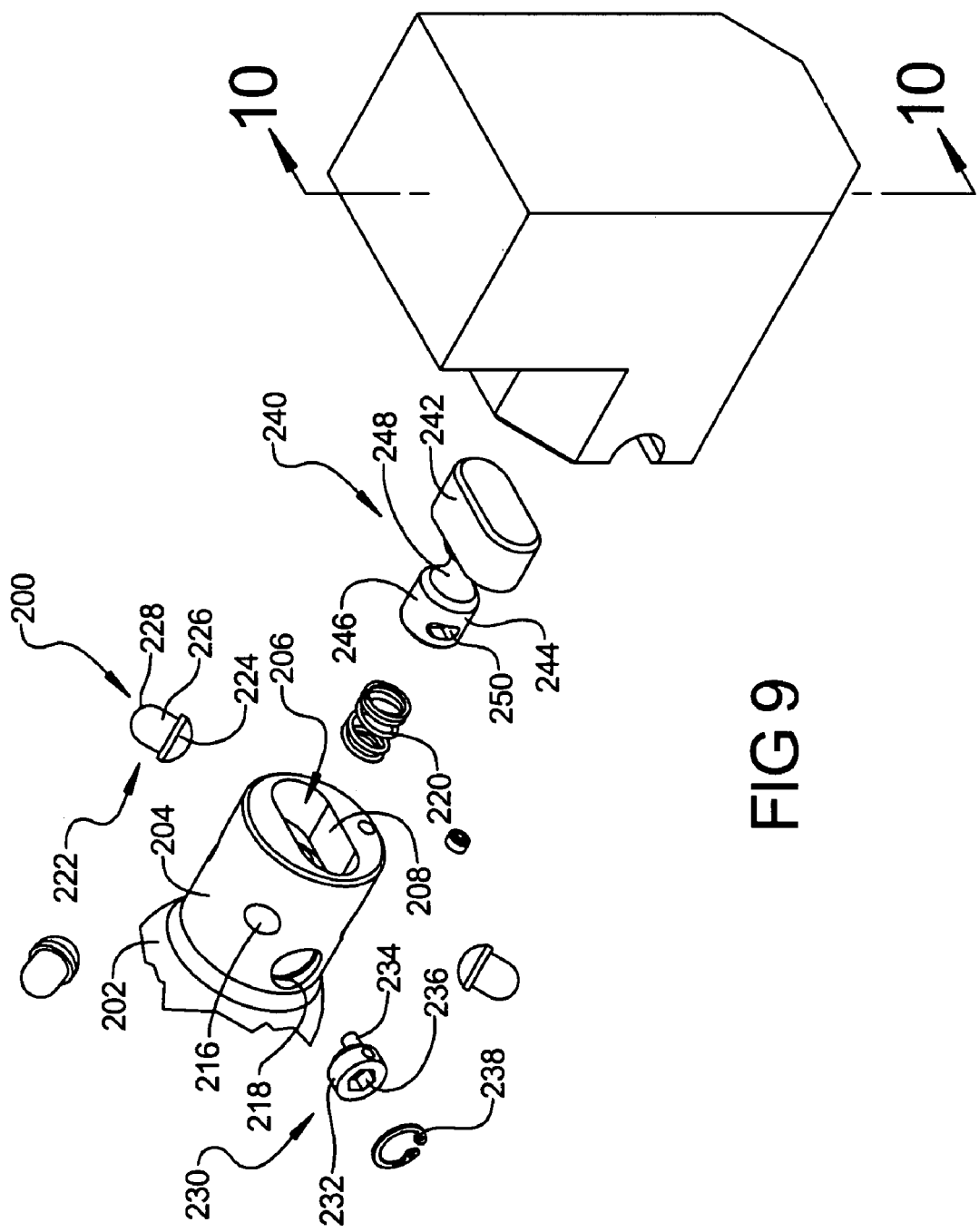
Figure 10A:
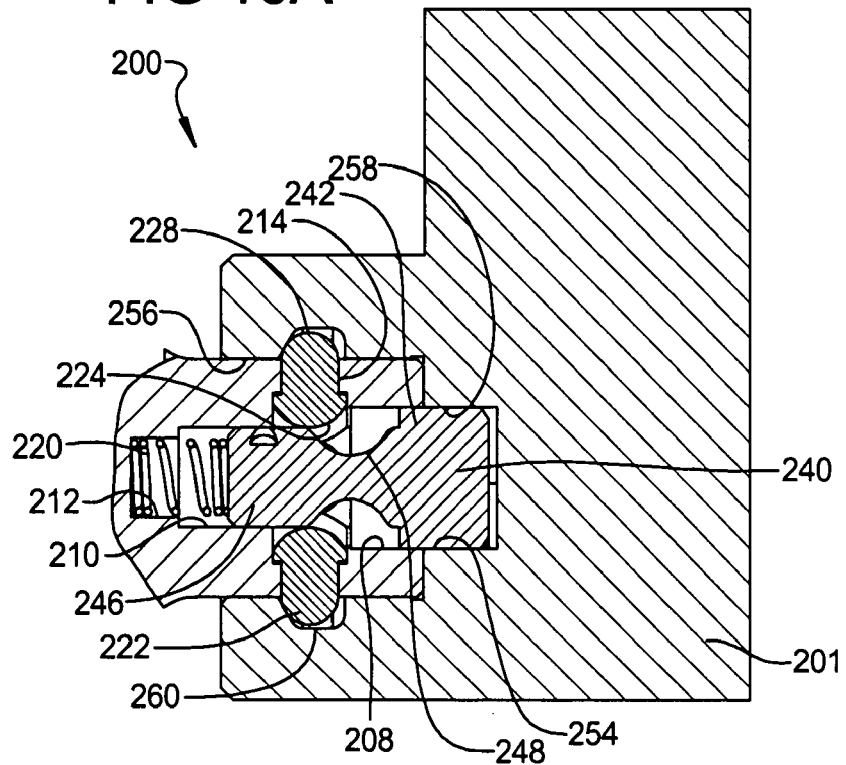
Figure 11:
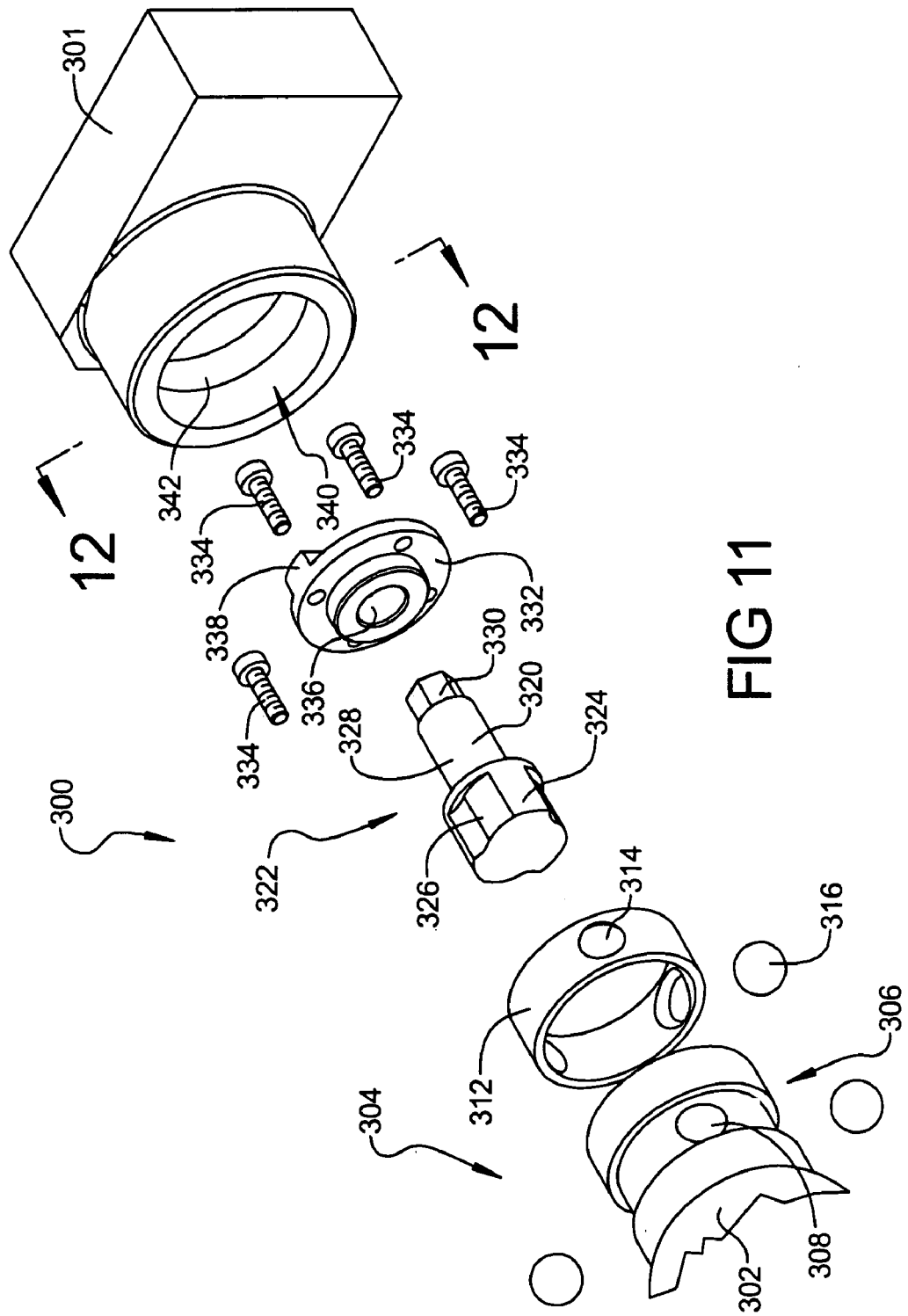

FIGS. 4A and B are cross-sectional views along line 4-4 of FIG. 2 showing the jaws in a retaining and releasing position, respectively;

FIG. 5 is an exploded assembly view of a first actuator arm assembly according to the present disclosure utilizing a single-piece bearing and a first quick-release mechanism according to the present disclosure;

FIG. 6 is a perspective view of the single-piece bearing of FIG. 5;

FIG. 7 is a bottom plan view of the single-piece bearing of FIG. 6;

FIGS. 8A and B are enlarged fragmented cross-sectional views of the first actuator arm assembly along line 8-8 of FIG. 2 with the quick-release mechanism in a released and engaged position, respectively;

FIG. 9 is a fragmented exploded view of a second actuator arm assembly utilizing a second quick-release mechanism according to the present disclosure;

FIGS. 10A and B are fragmented cross-sectional views of the assembled second actuator arm assembly along line 10-10 of FIG. 9 with the second quick-release mechanism in a released and engaged position, respectively;

FIG. 11 is a fragmented exploded view of a third actuator arm assembly utilizing a third quick-release mechanism according to the present disclosure;

FIGS. 12A and B are cross-sectional views of the assembled third actuator assembly along line 12-12 of FIG.

Figure 13:
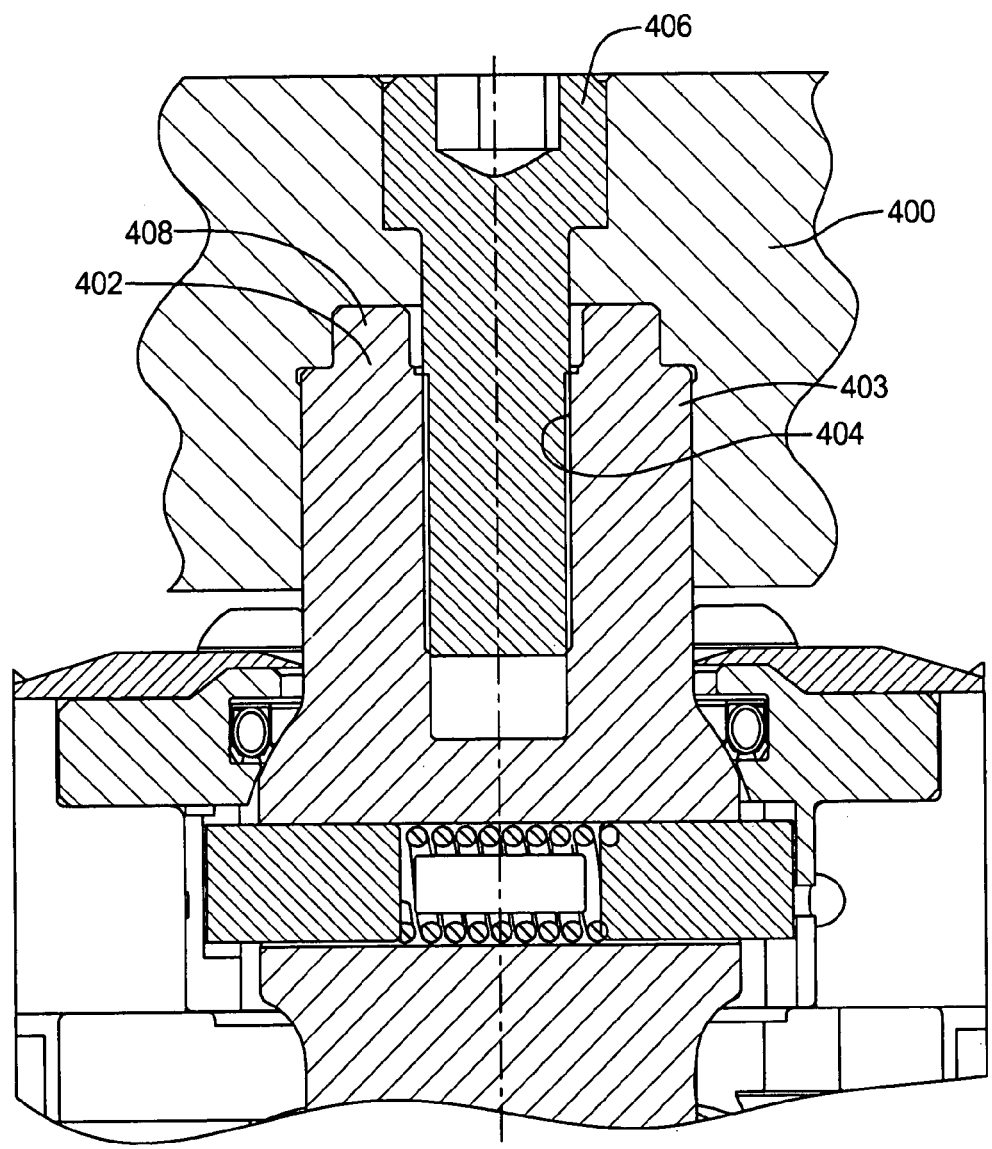

11 with the quick-release mechanism in a released and engaged position, respectively; and FIG. 13 is a fragmented cross-sectional view of a fourth actuator arm assembly showing the use of a single retaining bolt to secure a jaw thereto.

DETAILED DESCRIPTION

The following description is merely exemplary in nature and is not intended to limit the present disclosure, its application, or uses.

Referring to FIGS. 1-4, a workholding chuck assembly 20 according to the present disclosure is shown. The chuck 20 includes a housing subassembly 22 that includes a main body 24 and an end plate 26 attached in a sealing arrangement to a rear portion of the main body 24. A cavity 28 is formed between the main body 24 and the end plate 26. An actuator plate 30 is disposed in the cavity 28 and can move axially within the cavity 28 to allow the chuck 20 to retain and release workpieces as described below.

The actuator plate 30 includes a front hub 32 that resides within a central bore 34 in a front face 36 of the main body 24. A cover plate 38 is disposed over the central bore 34 in the front face 36 to prevent debris and other contamination from entering into the cavity 28 and the housing subassembly 22. The end plate 26 includes a central bore 40 that is configured to receive a rear hub 42 of the actuator plate 30. In this manner, the actuator plate 30 is supported for axial movement within the cavity 28 of the housing subassembly 22.

The end plate 26 and the main body 24 can include a plurality of openings 44, 45 that can be used to attach the housing subassembly 22 to an adaptor plate (not shown), which provides a proper bolt pattern for securing the chuck 20 to an appropriate lathe or other machining apparatus (not shown).

Figure 4B:
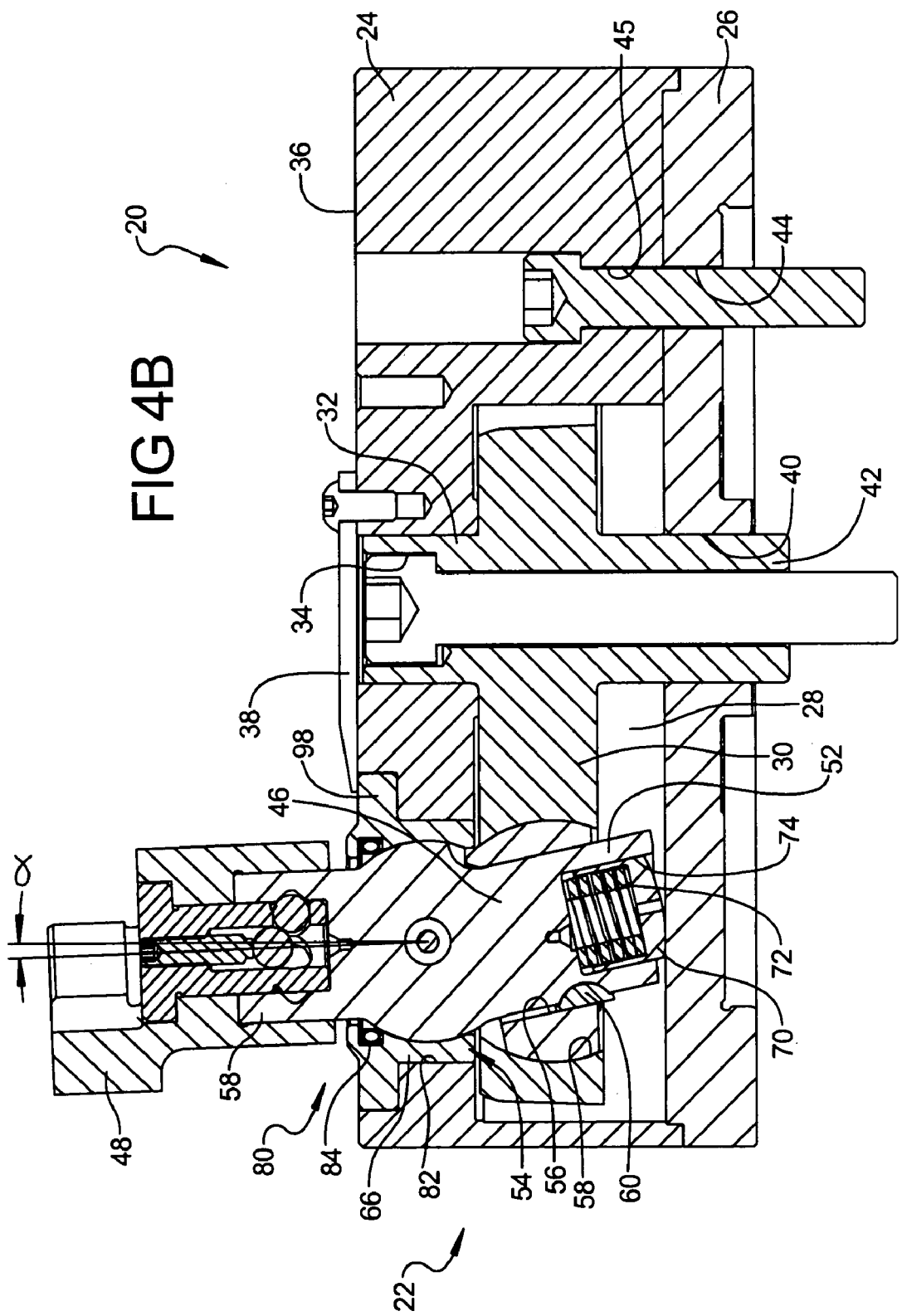

A plurality of actuator arms 46 is arranged within the housing subassembly 22 and can have a jaw 48 attached thereto. The actuator arms 46 can pivot about an axis within the housing subassembly 22 to cause the jaws 48 to move radially to retain and release a workpiece as described below. The actuator arms 46 are post-style arms that have a generally cylindrical front portion 50, a generally cylindrical rear portion 52, and a semi-spherical middle portion 54. The front and rear portions 50, 52 are axially offset from one another (not axially aligned), as shown in FIG. 4. The rear portion 52 is disposed within a rear bearing 56 having a generally semi-spherical exterior. The rear bearing 56 is disposed within an opening 58 in the actuator plate 30. The opening 58 has a concave inner periphery that is generally complementary to the generally semi-spherical exterior of the rear bearing 56. A key 60 prevents relative rotation between the rear portion 52 and the rear bearing 56. The middle portion 54 of the actuator arm 46 is disposed in a front bearing 66. The rear bearing 56 and the semi-spherical middle portion 54 of the actuator arm 46 are on a same front-rear center line (not shown). An end cap 70 and a spring 72 are disposed in a central bore 74 in the rear portion 52 of the actuator arm 46. The spring 72 biases the end cap 70 rearwardly and rides along the front surface of the end plate 26. The end cap 70 and the spring 72 thereby bias the actuator arm 46 forwardly and against the front bearing 66. The interior bore of the rear bearing 56 is offset and angled such that axial movement of the actuator plate 30 and the rear bearing 56 causes the actuator arm 46 to pivot within the front bearing 66 through an angle α relative to a front-rear center line of the front bearing 66, as shown in FIG. 4B. This pivoting motion of the actuator arms 46 moves the jaws 48 radially between a retaining position, as shown in FIG. 4A, and a releasing position, as shown in FIG. 4B, to grasp and release a workpiece, respectively.

Referring now to FIGS. 4-8, the actuator arm 46 is maintained within the chuck 20 by a front bearing assembly 80, which is secured to a stepped axial bore 82 in the front face 36 of the main body 24. The front bearing assembly 80 includes the front bearing 66, a seal ring assembly 84, and a plurality of retaining fasteners 86.

The front bearing 66 is a unitary non-split bearing that retains the actuator arm 46 within the housing subassembly 22. The front bearing 66 includes a generally circular front flange portion 94 and a generally cylindrical rear portion 96 extending rearwardly from the flange portion 94. The front bearing 66 is disposed within a stepped bore 82 in the front face 36 of the main body 24. The flange portion 94 includes a plurality of openings 100 that can receive fasteners 86 to secure the front bearing 66 to the housing subassembly 22. The front bearing 66 includes a central through opening 101 within which the actuator arm 46 is disposed. The central opening 101 includes an annular channel 102 in the flange portion 94 within which the seal ring assembly 84 is disposed. The seal ring assembly 84 includes a generally U-shaped annular member 104 with an annular spring 106 disposed therein. The annular spring 106 helps maintain contact between the annular member 104 and the exterior surface of the actuator arm 46 so as to retain grease within the front bearing 66.

The central opening 101 in the rear portion 96 of the front bearing 66 includes a front annular section 110 having a first radius and a rear annular section 112 rearward of the front annular section 110 having a second radius. The first and second radii can be the same. The first and second radii centers can be different. The rear portion 96 includes two axially extending pockets 116 that are spaced 180° apart. The pockets 116 are extended radially into front and rear sections 110, 112 to allow the semi-spherical middle portion 54 of the actuator arm 46 to be disposed therein, as described below.

Each pocket 116 includes a radial recess 118 that extends axially along the pocket 116. The recesses 118 work in conjunction with a homing mechanism 120 to allow limited rotational movement between the actuator arm 46 and the front bearing 66, as described below.

The rear portion 96 includes a removable wall portion 122 that forms part of one of the pockets 116 and includes the associated recess 118. The removable wall portion 122, as best seen in FIG. 7, includes convex sidewalls 124 that engage with complementary concave sidewalls 126 in the rear portion 96. Engagement between the convex sidewalls 124 and the concave sidewalls 126 radially secures the removable wall portion 122 within the rear portion 96. As a result of this engagement, the removable wall portion 122 is removed by axial movement relative to the rear portion 96. A set screw 128 (shown in FIG. 5) axially retains the removable wall portion 122 within the rear portion 96.

The semi-spherical middle portion 54 of the actuator arm 46 has a pair of opposing flats 132 that are spaced 180° apart with spherical surfaces 134 therebetween. The flats 132 allow the actuator arm 46 and the middle portion 54 to be inserted into the front bearing 66. Specifically, to insert the actuator arm 46 into the front bearing 66, the flats 132 are aligned 90° out of phase with the pockets 116 in the front bearing 66. With this alignment, spherical surfaces 134 are aligned with the pockets 116. This alignment allows the middle portion 54 to axially slide into the opening 101 and into the rear portion 96. Once the middle portion 54 is within the rear portion 96 and engaged with the seal ring assembly 84, the actuator arm 46 and/or the front bearing 66 can be rotated 90° relative to one another so that the flats 132 are now aligned with the pockets 116. With this alignment, the spherical surfaces 134 engage with the front and rear sections 110, 112 of the rear portion 96 between the pockets 116. Engagement of the spherical surface 134 with the front and rear sections 110, 112 enable the actuator arm 46 to pivot within the front bearing 66 to allow radial movement of the jaws 48 to grip and release a workpiece, as described below.

The middle portion 54 includes a radially extending through an opening 136 that receives the homing mechanism 120. The homing mechanism 120 allows limited relative rotation between the actuator arm 46 and the front bearing 66. The homing mechanism 120 includes a pair of engaging members 140 having tapered tips 142, a spring 144, and a rod 146. As best seen in FIG. 8, the engaging members 140, the spring 144, and the rod 146 are disposed in the opening 136 in the middle portion 54 of the actuator arm 46. The spring 144 biases the engaging members 140 radially outwardly so that the tips 142 engage with the recesses 118 in the rear portion 96 of the front bearing 66. The rod 146 limits relative radial movement of the engaging members 140 toward one another. The engagement of the tips 142 with the recesses 118 allows limited relative rotation between the actuator arm 46 and the front bearing 66 while biasing the actuator arm 46 toward an aligned home position within the front bearing 66. This limited relative rotation facilitates the engagement of the jaw 48 with a workpiece. Specifically, when clamping a workpiece in the chuck 20, the engagement of the jaws 48 with the workpiece may require some slight twisting of the jaws 48 relative to the workpiece to get a firm grip. This limited relative rotation is facilitated by the homing mechanism 120 associated with each actuator arm 46.

The removable wall portion 122 enables the homing mechanism 120 to be assembled in the opening 136. Specifically, when the actuator arm 46 is disposed in the front bearing 66, as described above, a first one of the engaging members 140 is inserted through the opening 136. The spring 144 and the rod 146 are then inserted into the opening 136. The other engaging member 140 can then be inserted into the opening 136 and forcibly pushed toward the other engaging member 140 and held in place against the force of the spring 144. The removable wall portion 122 can then be axially inserted into the rear portion 96 and the engagement of concave and convex sidewalls 126, 124 prevents the home mechanism 120 from coming out of the opening 136. The set screw 128 is then used to axially secure the removable wall portion 122 to the rear portion 96.

The jaws 48 are attached to the front portions 50 of the actuator arms 46. As shown in FIG. 5, the front portion 50 of the actuator arm 46 can include a pair of axially extending tangs 150. The tangs 150 can be offset (eccentric) relative to an axially extending center line (not shown) of the front portion 50. The tangs 150 can engage with complementary offset recesses 152 in an interior stepped through a bore 154 of the jaw 48. The jaw 48 includes a vent opening 156 to facilitate the positioning/removing the jaw 48 on/from the actuator arm 46. Engagement of the tangs 150 with complementary offset the recesses 152 in the jaw 48 prevents relative rotational movement between the jaw 48 and the actuator arm 46.

According to the present disclosure, the jaws 48 can be removably secured to the front portions 50 of the actuator arms 46 with a quick-release mechanism. A first quick-release mechanism 160, as best seen in FIGS. 5 and 8, uses a central bore 162 in the front portion 50 of the actuator arm 46 to secure the jaw 48 thereto. The central bore 162 includes a radially extending annular channel 164 to facilitate the retaining of the jaw 48 to the actuator arm 46. The quick-release mechanism 160 also includes an axially extending retaining member 166 having a head 168 and a stem 170. A central bore 172 extends axially through the retaining member 166. The central bore 172 includes a first portion 174 adjacent the head 168 that has a first diameter and a second portion 176 adjacent the end of a stem 170 having a second diameter larger than the first diameter. The first portion 174 is threaded. A threaded fastener 178 is disposed in the central bore 172 and engages with the threads in the first portion 174. The quick-release mechanism 160 also includes a first set of retaining balls 180 having a first diameter and a single actuating ball 182 larger than the retaining balls 180. Three radially extending openings 184 extend through the stem 170 adjacent its end. The openings 184 can be equally spaced about the periphery of the stem 170.

Figure 8B:
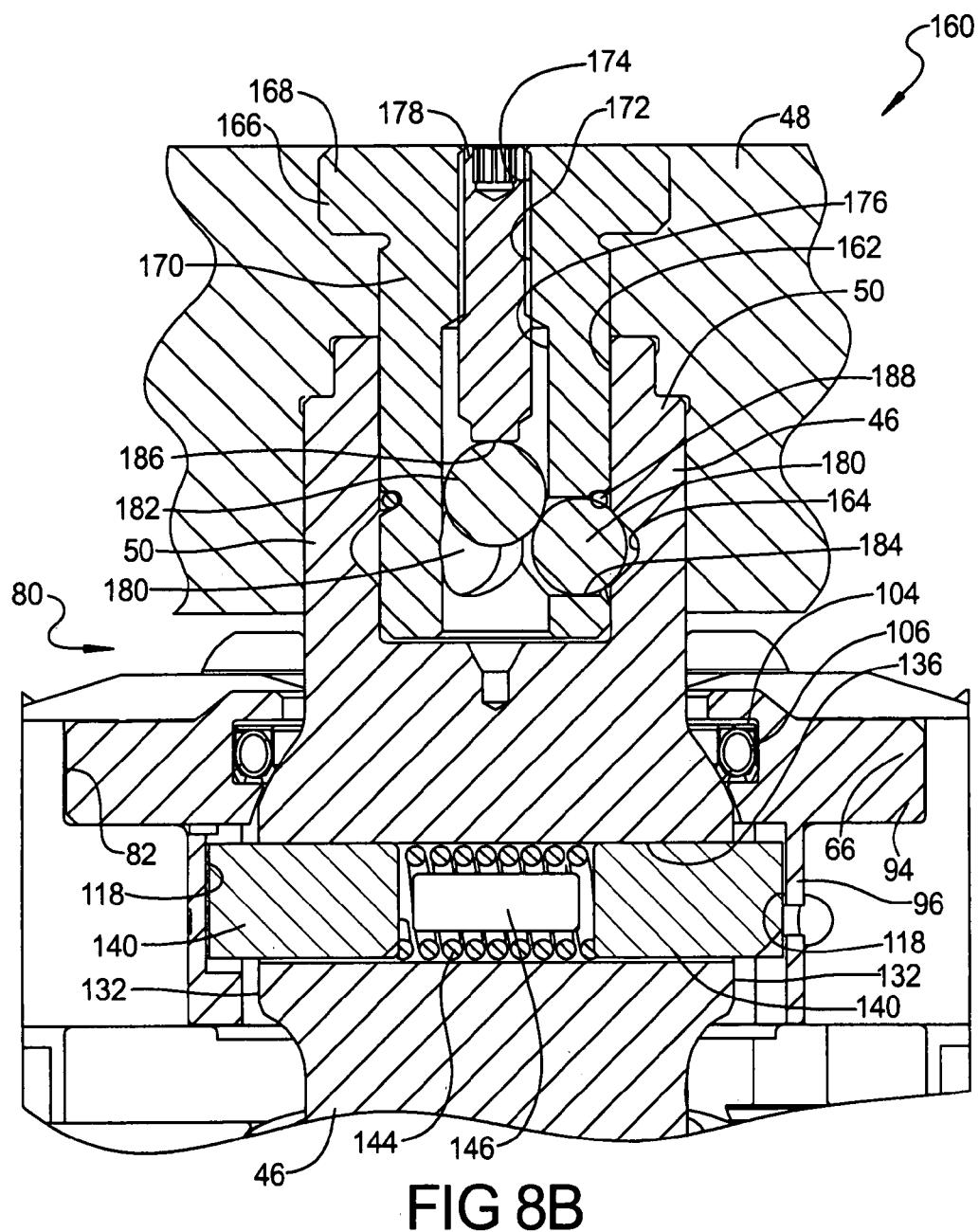

The actuating ball 182 and the retaining balls 180 are disposed in the second portion 176 of the central bore 172 with the retaining balls 180 aligned with the openings 184. The actuating ball 182 is disposed between the retaining balls 180 and an end 186 of the fastener 178. Retaining rings 188 (FIG. 8 only) can be disposed in the openings 184 to inhibit the retaining balls 180 from being pushed entirely through the openings 184. Non-removing axial movement of the fastener 178 relative to the retaining member 166 allows the quick-release mechanism 160 to secure the jaw 48 to the actuator arm 46, as shown in FIG. 8B, and allows the jaw 48 to be removed from the actuator arm 46, as shown in FIG. 8A. Specifically, as shown in FIG. 8B, when the fastener 178 is rotated in the appropriate direction a few rotations relative to the retaining member 166, the end 186 pushes the actuating ball 182 rearwardly into the retaining balls 180. This movement causes the retaining balls 180 to move radially outwardly into the openings 184 and protrude beyond the outer periphery of the stem 170 and into the annular channel 164. In this position, the retaining member 166 is secured to the actuator arm 46 and thereby retains the jaw 48 on the actuator arm 46.

When it is desired to remove the jaw 48 from the actuator arm 46, the fastener 178 is rotated the opposite direction relative to the retaining member 166. With a few rotations of the fastener 178, the end 186 no longer presses the actuating ball 182 against the retaining balls 180. The jaw 48 can then be pulled away from the actuator arm 46. The sloping nature of the annular channel 164 causes a radially inward force to be exerted on the retaining balls 180, thereby pushing the retaining balls 180 into the stem 170. The movement of the retaining balls 180 back into the stem 170 allows the jaw 48 to be removed from the front portion 50 of the actuator arm 46.

Thus, the quick-release mechanism 160 enables the jaws 48 to be quickly and easily attached to and removed from the actuator arms 46. the fastener 178 is not removed from the retaining member 166 during the operation of the quick-release mechanism 160. Rather, a few simple turns of the fastener 178 allows sufficient clearance between the end 186 and the actuating ball 182 to allow the retaining member 166 to disengage from the actuator arm 46. Conversely, a few simple turns of the fastener 178 in an opposite direction cause enough movement in the actuating ball 182 to push the retaining balls 180 into the annular channel 164 and secure the retaining member 166 to the actuator arm 46. The quick-release mechanism 160 thereby provides an easy and efficient way to change the jaws 48 so that the chuck 20 can be configured to receive different workpieces.

Referring now to FIGS. 9 and 10, a second quick-release mechanism 200 that can be used to secure the jaw 201 to an actuator arm 202 is shown. The middle and rear portions of the actuator arm 202 are substantially the same as that discussed above with reference to the actuator arm 46. As such, the middle and rear portions are not shown nor discussed. A front portion 204 of the actuator arm 202, however, is different. The front portion 204 includes a central bore 206 that extends axially into the actuator arm 202. A first portion 208 of the central bore 206 adjacent the end is a radially elongated slot. A second portion 210 of the central bore 206 rearward of the first portion 208 is generally cylindrical. A third portion 212 is rearward of the second portion 210 and is also cylindrical but has a diameter that is smaller than the second portion 210. A radially extending an annular channel 214 is disposed in the second portion 210 of the central bore 206. Three stepped through openings 216 extend through the annular channel 214 to the outer periphery of the front portion 204. The openings 216 can be equally spaced about the periphery of the front portion 204. Another through opening 218 extends through the front portion 204 and into the second portion 210 of the central bore 206 rearwardly of the openings 216.

The quick-release mechanism 200 includes a spring 220 that is disposed in the third portion 212 of the central bore 206. A retaining member 222 is disposed in each opening 216 of the central bore 206. The retaining members 222 each include a rounded inner head 224 and a stem 226 extending therefrom having a rounded end 228. The stepped openings 216 engage with the shoulder of the inner head 224 to prevent the retaining members 222 from passing entirely through the openings 216. A camming member 230 is disposed in the opening 218. The camming member 230 includes a head 232 and a pin 234 extending therefrom. The pin 234 is eccentrically attached to the head 232 (i.e., the pin 234 is offset from the rotational axis of the head 232). The head 232 includes a tool recess 236 that is configured to receive a tool therein to rotate the camming member 230 within the opening 218. A snap ring 238 retains the camming member 230 in the opening 218 and allows the camming member 230 to non-removably rotate within the opening 218.

An actuating member 240 includes a head 242 and a stem 244 extending therefrom. The head 242 is complementary to a slotted first portion 208 of the central bore 206. The stem 244 includes an end portion 246 that is generally cylindrical with a diameter slightly smaller than the diameter of the second portion 210 of the central bore 206. A neck portion 248 of the stem 244 is disposed between the end portion 246 and the head 242. The neck portion 248 has a diameter that changes between the end portion 246 and the head 242 with a smallest diameter at a general midpoint location of the neck portion 248. The end portion 246 includes a slot 250 on a periphery thereof. The slot 250 receives the eccentric pin 234 of the camming member 230. Rotation of the camming member 230 pushes on the slot 250, which, in turn, moves the actuating member 240 axially within the central bore 206.

The jaw 201 has an axially extending stepped bore 254 that is configured to receive the front portion 204 of the actuator arm 202. A first portion 256 of the bore 254 is circular and is complementary to the exterior of the front portion 204 of the actuator arm 202. A second portion 258 of the bore 254 is slotted and is complementary to the slotted head 242 of the actuating member 240. The first portion 256 of the bore 254 includes a radially extending annular channel 260 that is configured to receive the ends 228 of the retaining members 222.

Figure 10B:
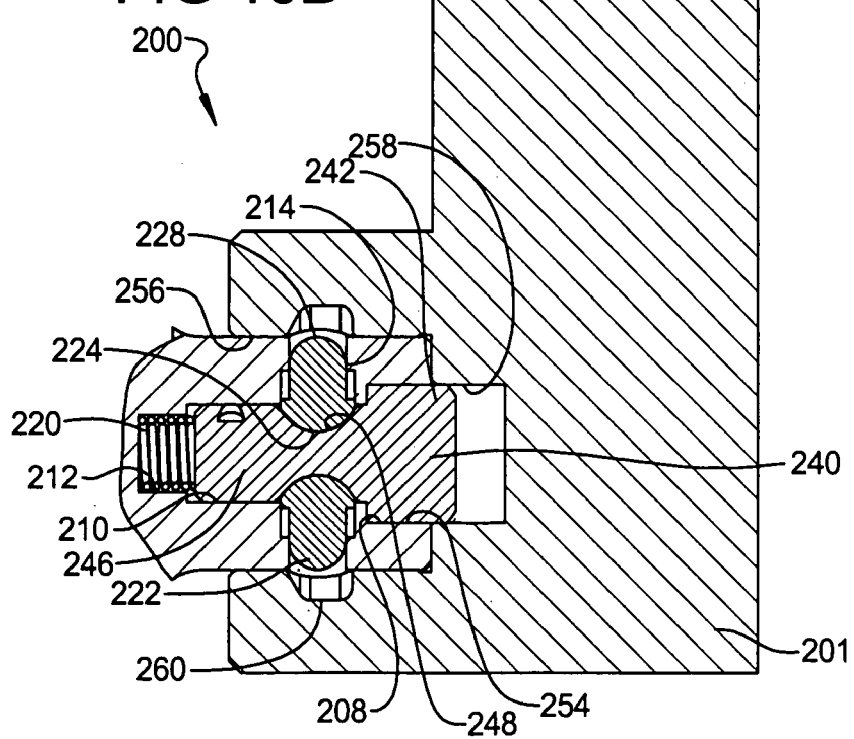

The quick-release mechanism 200 allows the jaw 201 to be easily and quickly secured to and removed from the actuator arm 202. Non-removing rotation of the camming member 230 moves the actuating member 240 axially between a release position, as shown in FIG. 10A, and a retaining position, as shown in FIG. 10B. The spring 220 biases the actuating member 240 toward the retaining position. When the quick-release mechanism 200 is in the engaged position, as shown in FIG. 10B, the jaw 201 is secured to the actuator arm 202 through the interaction of the retaining members 222 and the annular channel 260. Specifically, the spring 220 biases the actuating member 240 forwardly toward the jaw 201. As a result, the inner heads 224 of the retaining members 222 engage the end portion 246 of the actuating member 240. This engagement pushes the retaining members 222 radially outwardly such that the ends 228 engage with the annular channel 260. This engagement prevents the jaw 201 from being moved axially relative to the actuator arm 202. Additionally, with the actuating member 240 in the engaged position, the head 242 is disposed in the slotted second portion 258 of the stepped bore 254 and the jaw 201. The engagement of the head 242 with the slotted second portion 258 prevents relative rotation between the jaw 201 and the actuator arm 202. Thus, when in the engaged position, the jaw 201 is secured to the actuator arm 202 and the actuator arm 202 can be pivoted to allow the jaws 201 to retain and release a workpiece.

When it is desired to remove the jaw 201, the camming member 230 is non-removably rotated within the opening 218 with an appropriate tool. Rotation of the camming member 230 causes the pin 234 to push the actuating member 240 rearwardly within the actuator arm 202 against the biasing force of the spring 220. The rearward movement of the actuating member 240 results in the inner heads 224 of the retaining members 222 being aligned with the neck portion 248 of the actuating member 240, as shown in FIG. 10B. The jaw 201 can then be moved axially relative to the actuator arm 202. If the ends 228 of the retaining members 222 are protruding into the annular channel 260, the tapering nature of the annular channel 260 and the rounded nature of the ends 228 cause a radially inward force on the retaining members 222 such that the retaining members 222 move radially inwardly and into engagement with the neck portion 248 and allow the jaw 201 to be removed from the actuating arm 202. Once the jaw 201 has been removed from the actuator arm 202, the user can release the camming member 230, which can result in the actuating member 240 staying in place or moving forwardly under the influence of the spring 220.

To attach the jaw 201 to the actuating arm 202, the camming member 230 is rotated, if needed, to move the actuating member 240 rearwardly into the actuating arm 202, which allows the retaining members 222 to be moved radially inwardly. The rounded nature of the ends 228 can allow the jaw 201 to push the retaining members 222 radially inwardly when positioning the jaw 201 on the front portion 204 of the actuator arm 202. Once the jaw 201 is securely positioned on the actuator arm 202, the camming member 230 can be rotated to move the quick-release mechanism 200 to the engaged position, as shown in FIG. 10A. In some instances, the movement of the quick-release mechanism 200 from the disengaged to the engaged position may be done entirely as a result of the influence of the spring 220 once the camming member 230 is released from being held in the disengaged position.

Thus, the second quick-release mechanism 200 according to the present disclosure can easily and quickly allow the jaws 201 to be attached to and removed from the actuator arms 202. It should be appreciated that the jaw 201 is shown as being a blank that can be machined to provide a desired gripping surface or features for retaining a workpiece therein.

Referring now to FIGS. 11 and 12, a third quick-release mechanism 300 that allows quick and easy attachment/removal of a jaw 301 to/from an actuator arm 302 according to the present disclosure is shown. In the third quick-release mechanism 300, the middle and rear portions of the actuator arm 302 are substantially the same as the middle and rear portions of the actuator arm 46 discussed above. As such, the middle and rear portions are not shown nor discussed. A front portion 304 of the actuator arm 302, however, is different. The front portion 304 is generally cylindrical and includes a radially inwardly extending recess 306 therein. A plurality of through openings 308 extends through the recess 306 into a central bore 310 of the front portion 304. A ring member 312 is configured to fit around the front portion 304 within the recess 306. The ring member 312 includes a plurality of tapered openings 314 that align with the openings 308 in the recess 306. A plurality of retaining balls 316 is disposed in the central bore 310 and can extend radially outwardly through the openings 308, 314. Radial movement of the retaining balls 316 relative to the openings 308, 314 allows the jaw 301 to be secured to and removed from the actuator arm 302, as described below.

An actuating member 320 includes a camming portion 322 having a plurality of generally cylindrical surfaces 324 with a plurality of ramps 326 disposed therebetween. The ramps 326 have a radial dimension that changes between adjacent cylindrical surfaces 324, as best seen in FIG. 12. A stem 328 extends forwardly from the camming portion 322 and includes a head 330 that can be engaged with a tool to non-removably rotate the actuating member 320 within the actuator arm 302 as described below.

An end plate 332 is configured to attach to the end of the front portion 304 to secure the actuating member 320 and the retaining balls 316 within the central bore 310 and to retain the ring member 312 on the front portion 304 of the actuator arm 302. The end plate 332 can be secured to the actuator arm 302 with a plurality of fasteners 334. The end plate 332 includes a central bore 336 through which the head 330 and the stem 328 of the actuating member 320 extend. A pair of tangs 338 extends from the end plate 332 and is offset from the central axis of the central bore 336. The tangs 338 engage with complementary offset recesses (not shown) at the end of a central bore 340 of the jaw 301 to prevent relative rotation between the actuator arm 302 and the jaw 301.

The central bore 340 of the jaw 301 includes a radially extending annular channel 342. The annular channel 342 aligns with the openings 308, 314 when the jaw 301 is positioned on the actuator arm 302. Non-removing rotation of the actuating member 320 relative to the jaw 301 and the actuator arm 302 causes radial movement of the retaining balls 316 relative to the actuator arm 302 and the jaw 301 to allow the jaw 301 to be secured to and released from the actuator arm 302.

As shown in FIG. 12A, when the retaining balls 316 are engaged with the ramps 326 of the actuating member 320, the retaining balls 316 do not extend into the annular channel 342. In this position, the jaw 301 can be removed from or positioned on the actuator arm 302. To retain the jaw 301 to the actuator arm 302, the actuating member 320 is rotated relative to the actuator arm 302 and the jaw 301. This relative rotation causes the ramps 326 to push the retaining balls 316 radially outwardly through the openings 308, 314 and into the annular channel 342. With sufficient rotation, the cylindrical surfaces 324 engage with the retaining balls 316 to provide the maximum radially outward position for the retaining balls 316. In this position, the jaw 301 is axially secured to the actuator arm 302 by the retaining balls 316. The tangs 338 prevent relative rotation between the jaw 301 and the actuator arm 302.

To release the jaw 301, the actuating member 320 is rotated in the opposite direction so that the retaining balls 316 engage with the ramps 326 and can move radially inwardly. The annular channel 342 can have sloped surfaces such that axial movement of the jaw 301 relative to the actuator arm 302 can exert a radially inward force on the retaining balls 316 to facilitate movement of the retaining balls 316 radially inwardly when releasing the jaw 301.

Thus, the third quick-release mechanism 300 according to the present disclosure can easily and quickly allow the jaws 301 to be secured to and removed from the actuator arms 302. Again, it should be appreciated that the jaw 301 is shown as a blank and can be machined to provide the desired gripping features for the jaw 301.

Referring now to FIG. 13, a cross-sectional view of another way to retain a jaw 400 to a front portion 402 of an actuator arm 403 is shown. Specifically, the front portion 402 includes a threaded central bore 404. A single-threaded fastener 406 can be secured in the central bore 404 to retain the jaw 400 on the front portion 402. The front portion 402 can include a pair of tangs 408 that are eccentric relative to an axial center of the central bore 404. The tangs 408 can engage with complementary recesses at an end of a bore 410 in the jaw 400 to prevent relative rotation between the jaw 400 and the actuator arm 403. Thus, if desired, the single-threaded fastener 406 can be used to retain the jaw 400 to the actuator arm 403. It should be appreciated, however, that the use of the single-threaded fastener 406 does not provide the quick-release capability described above with reference to the quick-release mechanisms 160, 200, and 300. Further, the single-threaded fastener 406 is removed to change the jaw 400.

The quick-release mechanism and the unitary non-split upper bearing of the present disclosure can be used together or separately in new chuck assemblies or can be used together or separately to retrofit existing chuck assemblies not having these features. To facilitate this, kits can be sold to upgrade the existing chuck assemblies. In particular, as shown in FIG. 5, a retrofit kit 500 can include the actuator arm 46, the homing mechanism 120, the seal ring assembly 84, the front bearing assembly 80, the quick-release mechanism 160, and the jaw 48. The jaw 48 can be provided as a blank to be machined by the purchaser for the particular workpiece to be held or can be pre-machined in the desired configuration to hold a workpiece. Optionally, the retrofit kit 500 can include the end cap 70 and the spring 72. It should be appreciated that the quick-release mechanism included in the retrofit kit 500 can be any of the quick-release mechanisms described herein. Furthermore, if desired, in lieu of a quick-release mechanism, the retrofit kit 500 can be configured to use a single-threaded fastener 406 to retain a jaw to the associated actuator arm. Thus, the retrofit kit 500 can be used to retrofit an existing chuck assembly to provide the benefits of a unitary non-split upper bearing and/or a quick-release mechanism and/or a single fastener attaching method.

The workholding chuck according to the present disclosure is suitable for use in a high-speed application. For example, the chuck according to the present disclosure can be used on a lathe or other machining apparatus that rotates the chuck assembly at speeds in excess of 3,000 RPM. It should be appreciated, however, that the chuck assembly can be used on lower-speed applications, although all the benefits of the present disclosure may not be realized. Additionally, it should be appreciated that the quick-release mechanisms and the non-split unitary front bearing of the present disclosure can be used together or separately. Additionally, the quick-release mechanisms and/or the non-split unitary front bearing can be used with actuator arms that are driven by other means than the actuator plate 30 disclosed herein. For example, the non-split unitary bearing and/or quick-release mechanism of the present disclosure can be used on an actuator arm disposed in an equalizing chuck, such as that shown in U.S. Pat. No. 6,655,699, entitled "Six Jaw Equalizing Chuck," the disclosure of which is incorporated herein by reference. Moreover, while the present disclosure shows a chuck having three actuating arms and three jaws, it should be appreciated that more or less than three actuator arms and/or jaws can be used. Thus, while the present disclosure has been described with reference to particular illustrations and figures, it should be appreciated that changes can be made to that shown without deviating from the present disclosure. Thus, the description is merely exemplary in nature and variations are not to be regarded as a departure from the spirit and scope of the present disclosure.

What is claimed is:

1. A workholding chuck assembly for holding a workpiece, the chuck assembly comprising:
    a housing having a front face;
    a plurality of actuator arms in said housing, said actuator arms having a first end portion extending from said front face and operable to receive a workpiece retaining jaw thereon, a second end portion in said housing and an intermediate portion between said first and second end portions, said intermediate portion including a semi-spherical section having at least two semi-spherical surfaces with radially recessed surfaces therebetween;
    a plurality of non-split unitary bearings having a bore therethrough, each of said bearings being disposed around said semi-spherical section of said intermediate portion of an associated one of said actuator arms, each bore having an engaging surface that engages with said semi-spherical surfaces and at least two radially recessed pockets; and
    at least one actuator coupled to said second end portions and operable to drive pivotal movement of said actuator arms in said bearings to retain and release a workpiece.

2. The workholding chuck assembly of claim 1, wherein said radially recessed surfaces of said semi-spherical section are aligned with said radially recessed pockets when said actuator arms pivot to retain and release a workpiece.

3. The workholding chuck assembly of claim 2, wherein engagement of said bore engaging surface with said semi-spherical surfaces of said semi-spherical sections limit axial movement between said actuator arms and said bearings.

4. The workholding chuck assembly of claim 2, wherein said radially recessed surfaces of said semi-spherical section and said radially recessed pockets allow said semi-spherical section to be inserted into said bore of an associated one of said bearings.

5. The workholding chuck assembly of claim 1, wherein said bore engaging surface of each of said bearings includes a first axially curving annular section having a first radius of curvature and a second axially curving annular section having a second radius of curvature different than said first radius of curvature.

6. The workholding chuck assembly of claim 1, wherein said bearings are mounted to said front face of said housing.

7. The workholding chuck assembly of claim 1, further comprising a plurality of homing mechanisms each coupled to one of said actuator arms, each of said homing mechanisms engaging with said bore engaging surface of an associated bearing and allowing limited relative rotation between said actuator arm and said bearing and biasing said actuator arm to a predetermined orientation relative to said bearing.

8. The workholding chuck assembly of claim 7, wherein each of said bearings includes a removable wall portion that forms a portion of said bore, said removable wall portion engaging with said homing mechanism.

9. The workholding chuck assembly of claim 1, further comprising a quick- release mechanism operable to selectively attach and detach workpiece retaining jaws from said actuator arms.

10. A workingholding chuck retro-fit kit comprising:
    an actuator arm having a first end portion operable to receive a workpiece retaining jaw thereon, a second end portion operable to be coupled to a chuck actuating member, and an intermediate portion between said first and second end portions, said intermediate portion including a semi-spherical section having at least two semi-spherical surfaces with radially recessed surfaces therebetween; and
    a non-split unitary bearing having a bore therethrough with an engaging surface and at least two radially recessed pockets, said bearing being disposable around said semi- spherical section of said intermediate portion of said actuator arm with said bore engaging surface engaging with said semi-spherical surfaces.

11. The retro-fit kit of claim 10, wherein said radially recessed surfaces of said semi-spherical section are aligned with said radially recessed pockets when said actuator arm is operatively disposed in said bearing.

12. The retro-fit kit of claim 11, wherein said radially recessed surfaces of said semi-spherical section and said radially recessed pockets allow said semi-spherical section to be inserted into said bore of said bearing.

13. The retro-fit kit of claim 10, further comprising a jaw operable to be coupled to said first end portion of said actuator arm.

14. The retro-fit kit of claim 13, further comprising a quick-release assembly having at least one retaining member operable to selectively secure said jaw to and allow removal of said jaw from said actuator arm through non-removing movement of a component of said quick-release assembly coupled to said retaining member.

* * * * *